US006823175B1

(12) United States Patent
Zayana et al.

(10) Patent No.: US 6,823,175 B1
(45) Date of Patent: Nov. 23, 2004

(54) METHOD FOR SIMULTANEOUSLY MEASURING THE PROPAGATING CHARACTERISTICS OF A PLURALITY OF RADIOELECTRIC CHANNELS

(75) Inventors: Karim Zayana, Epône (FR); Daniel Duponteil, Vanves (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/763,120

(22) PCT Filed: Aug. 20, 1999

(86) PCT No.: PCT/FR99/02019

§ 371 (c)(1), (2), (4) Date: Feb. 16, 2001

(87) PCT Pub. No.: WO00/11805

PCT Pub. Date: Mar. 2, 2000

(30) Foreign Application Priority Data

Aug. 20, 1998 (FR) .......................................... 98 10577

(51) Int. Cl.[7] .......................... H04B 17/00; H04Q 7/20; H04Q 7/00

(52) U.S. Cl. ................................ 455/67.11; 455/67.15; 455/67.16; 455/424; 455/437; 455/442; 370/328; 370/329; 370/330; 370/331; 370/332; 370/333; 375/343

(58) Field of Search ............................. 455/424, 67.11, 455/67.15, 67.16, 437, 442; 370/328, 329, 330, 331, 332, 333; 375/343

(56) References Cited

FOREIGN PATENT DOCUMENTS

DE 42 33 222 4/1994

OTHER PUBLICATIONS

Gerhard Kadel, "Measurement of Wideband Micro– and Macro–diversity Characteristics of the Mobile Radio Channel", Mar. 1994, pp. 165–169.

Gerhard Kadel, "Simulation of the DECT System Using Wideband Channel Data", Oct. 1993, pp. 546–560.

T. Felhauer et al., "Optimized Wideband System bor Unbiased Mobile Radio Channel Sounding with Periodic Spread Spectrum Signals", Aug. 1993, pp. 1016–1028.

R. W. Lorenz, "Outdoor Wideband Mobile–Radio Propagation Studies in Europe", Feb. 1993, pp. 65–77.

*Primary Examiner*—Vivian Chin
*Assistant Examiner*—Eugene Yun
(74) *Attorney, Agent, or Firm*—Pearne & Gordon LLP

(57) ABSTRACT

A process for simultaneously measuring the propagation characteristics of a plurality of radio-frequency channels.

According to the invention, from several base stations are transmitted signals whose spectra are interleaved. At the receive end, each of these spectra may be reproduced and the impulse response of each channel may be calculated.

Application to radio-communications with mobiles.

9 Claims, 8 Drawing Sheets

METHOD FOR SIMULTANEOUSLY MEASURING THE PROPAGATING CHARACTERISTICS OF A PLURALITY OF RADIOELECTRIC CHANNELS

TECHNICAL FIELD

The object of the present invention is a process for simultaneously measuring the propagation characteristics of a plurality of radio-frequency channels. It finds an application in radio-communications with mobiles. The radio-frequency channels, whose characteristics are being measured, are here wideband.

STATE OF THE PRIOR ART

In a radio-communications system with mobiles, as for example in the GSM system or in the IS-95 system, a microwave signal is propagated between fixed base stations, connected to the telephone network, and mobile users, to be called hereinafter mobile stations. Each connection between a base station and a mobile station is made by means of a radio-frequency or mobile radio channel.

The microwave signal reaches the mobile station (in a so-called down direction) or the base station (in a so-called up direction) with more or less attenuated and phase offset echoes, a consequence of the obstacles encountered during propagation. The signal undergoes overall an attenuation which fluctuates according to the displacements of the mobile. Two fluctuation scales may be distinguished: rapid fluctuations, caused by interference, and slow fluctuations due to modifications in the environment or in mobile station-base station separation when the mobile is displaced over great distances. These attenuations affect in the first place the signal-to-noise ratio. But multiple paths also generate interference between symbols, which is all the more marked the higher the information rate.

To improve transmission performance, it is conceivable to transmit the same signal from several different sources (transmitter diversity) or to receive it in different places (receiver diversity). When one of the connections becomes too attenuated or is subject to too much interference between symbols, an automatic transfer (or "handover") procedure is used. Processing algorithms are also conceivable which combine the signals coming from several channels.

A growing number of high bit rate transmission systems provide for the use of space diversity or polarisation diversity. Space micro-diversity (using several close transmit and receive antennae) or polarisation micro-diversity (dual polarisation transmission or reception) make it possible to counter multiple paths and rapid fading. Macro-diversity (connection between one mobile and several base stations) may also be used to this end. It also makes it possible to counter masking effects and to smooth transitions between cells.

It consequently becomes indispensable to have full control over measuring the propagation characteristics of the different channels which may be used in diversity so that new networks can be designed and deployed in the best way.

Measurement cycles in micro-diversity at mobile station level or in polarisation diversity at mobile station level do not raise any particular problems. The channel sensing signal is transmitted from the base station. The antennae are placed on a vehicle containing the reception means, these antennae being a few centimetres apart in space micro-diversity or superimposed in polarisation diversity. They are connected to a same sensing device, which will for example read alternately on one and on the other the signal delivered by the antennae. Rotating the vehicle wheel triggers the signal acquisitions. It is said that the configuration is "master distance" It is easy to recognise the exact position of each measuring point when going through the results.

Micro-diversity at base station level and macro-diversity are much trickier to achieve. These difficulties may be stressed by distinguishing "master time" methods and "master distance" methods:

a) "Master Time" Methods

In space micro-diversity at the base station, several antennae are a few centimetres apart. In polarisation diversity, they are superimposed.

The channel between the mobile station and the base station being reciprocal, the signal may very well be transmitted from the mobile station and be received in diversity at the base station. A receive end technician must always be present to trigger the beginning then the end of the measurements. Acquisitions occur at a regular rate; they are controlled by a receive-end clock. The method is called "master time".

In this configuration, the vehicle must travel at a constant speed so that the exact location of the measuring points may be reconstituted. This is only possible over small sections and some routes may have to be ruled out because of road traffic.

In macro-diversity, the antennae are spaced apart by several hundred metres. Channel measurements in "master time" therefore require several sensing devices, in the event one at each station. A technician must be present on each site. The problems previously raised in respect of micro-diversity remain. To these may be added difficulties in synchronising measurements: the moments of triggering and then stopping the recordings must be common to the different sites.

b) "Master Distance" Methods

Different methods have been proposed for carrying out measurements in diversity at the base station or in macro-diversity, on two channels, and in a configuration of the "master distance" type.

A first solution, the most straightforward conceptually, consists in transmitting the same sensing signal on the two connections. Superimposition of the impulse responses of the two channels is obtained. These responses are disassociated if they are sufficiently offset in time. For this the transmitter sequences must be synchronised. This technology is described in the article by M. G. KADEL entitled "Measurement of wideband micro-and macro-diversity characteristics of the mobile radio channel" published in IEEE, Proc. of VTC, Stockholm, Sweden, 1994, pages 165 to 169.

Synchronisation of sequences is a priori possible in micro-diversity or in polarisation diversity. It is complex to achieve in macro-diversity since two independent transmitters are being worked with. The sequences can always be randomly offset by reinitialising a sequence of one or other of the transmitters. At all events, good transmitter synchronisation is only verified at the receive end by displaying the main impulse response peaks and by noting their effective separation. It is only on this condition that measurements of a section may begin.

The length of a sequence must be at least equal to twice the spread of delays of the impulse responses measured. In macro-diversity, the peaks of the two impulse responses shift independently of each other during displacement of the mobile. It is therefore necessary for there to be ample room for manoeuvre, especially when synchronisation is obtained randomly by reinitialising a transmitter.

The sequence length used in practice with this method is of the order of 100 μs. The method is difficult to apply to more than two transmitters, since recognition then synchronisation of sequences may prove difficult to achieve.

Another problem appears in macro-diversity since the oscillators of the two transmitters drift apart independently. They are not subject to the same clock and the impulse responses calculated may in the end overlap. The results become unusable when these drifts are substantial, which may unfortunately occur while it is difficult to verify stability at the time of measurement.

A second solution is described in the article by G. KADEL entitled "Simulation of the DECT System Using Wideband Channel Data Measured in Two Diversity Branches, Proceedings of the 2nd International Conference on Universal Personal Communications (ICUPC), Ottawa, pp. 546 to 550. This solution consists in offsetting the carrier frequency of the second transmitter relative to that of the first. In practice, an offset Δf of about 20 Hertz may be introduced. The composite signal received is demodulated to the frequency of the first transmitter. After processing, the two superimposed impulse responses may be observed. The slight frequency offset of the second transmitter introduces artificially a Doppler effect. The measurement remains of good quality since the sequence is of very short duration, at the most 100 μs, comparatively to the 50 ms of the Doppler period. When the mobile is in sleep mode, the impulse responses corresponding to the second channel fluctuate in time, whereas those of the first do not vary. Two ways of conducting the experiments are conceivable:

- for each measuring point, the mobile stops then initiates a series of recordings; after processing, the Doppler spectrum of each delay is calculated in baseband from the successive responses; the contribution to this spectrum of the channel 1 is theoretically of one null frequency line, that of the channel 2 of a line distant by Δf from the first; the sampling theorem is satisfied when the acquisitions have occurrences of 25 ms; low pass filtering in baseband insulates the information from one or the other channel;
- when the mobile is moving very slowly, it may be supposed that the artificial Doppler effect takes precedence over the real Doppler effect; it is then conceivable for the acquisitions to be made during displacement and always at regular intervals of time; the contribution of each channel to the Doppler spectrum of a given delay is no longer a simple line; it remains however centred around this line; as a precaution, in practice the acquisitions must be lower than 25 ms; to avoid a two channel frequency overlap, the speed of the mobile is limited to 1 m/s (4 km/h).

This method too has numerous drawbacks. Firstly, it does not offer a practical "master distance" solution. It compels, indeed, stopping at each measuring point in the first version, or travelling very slowly (4 km/h) at uniform speed in the second. Moreover, channel separation leads to sluggishness in the calculations. Each impulse response sample is obtained by filtering the information observed over about a hundred consecutive acquisitions at a given delay. This operation must be repeated for each sample of the sequence received, therefore a good hundred times. The complexity of receive-end processing is multiplied by a factor of 10,000 at least relative to a diversity-free measuring method.

When measurements are triggered every 25 ms, the time required for the acquisition of about a hundred sequences takes more than two seconds. The channel must therefore be presupposed to be stationary over this period of time. Such a hypothesis may well not be verified when vehicles are moving about in the vicinity of the mobile.

The purpose of the present invention is indeed to overcome these drawbacks of the prior art. It proposes a process of the "master distance" type allowing the simultaneous analysis of several channels on a same band, while combining ease of implementation with signal processing simplicity. The invention is implemented so as to observe the impulse responses over a time duration T adapted to the environment to be sensed.

DISCLOSURE OF THE INVENTION

The process of the invention does not require the sequence of one of the transmitters to be reinitialised or the offsets between sequences to be followed over time. It operates in real time; a measurement at a certain moment makes it possible to calculate the impulse responses of the channels at that moment. It is very economical in calculation time; its complexity is that of diversity-free measurement techniques, multiplied by the number of channels.

The measurements being controlled in distance, the vehicle is no longer compelled to move at a uniform speed. Reconstituting routes therefore does not pose any major problems. It is no longer necessary to mobilise a technician to trigger the measurements on each site. The synchronisation problems raised in respect of macro-diversity are also avoided.

In an exact way, an object of the present invention is a simultaneous measurement process, over an observation period T, of the propagation characteristics of a plurality of p radio-frequency channels (p whole number at least equal to 2) between p base stations and a mobile station, characterised in that:

- from each of the base stations is transmitted simultaneously a periodic signal of period pT, the signal transmitted by the station of rank n (n going from 1 to p) having a spectrum constituted by lines located on frequencies $(k/T)+((n-1)/pT)$ where k is the number of the line,
- the p signals transmitted by the p stations are received simultaneously in the mobile station and the signals received are processed in a time window of width pT so as to extract the p impulse responses of the p radio-frequency channels.

To transmit from the $n^{th}$ station the signals in question, the following procedure may be adopted:

- a sequence of elements of duration T is produced,
- this sequence is reproduced with a period T so as to obtain a periodic signal of period T,
- a carrier wave is produced having a frequency equal to the central frequency Fc of the frequency band to be analysed,
- the frequency of the carrier wave is offset by the quantity $(n-1)/pT$,
- the signal obtained is transmitted after modulation of the carrier thus offset.

Preferably, the band of the transmitted signals is reduced by filtering so as to limit the band to a width B, the spectra of the transmitted signals extending from $-B/2$ (inclusively) to $B/2$ (exclusively) and the number k thus taking all the whole values between $-N$ (inclusive) and $N-1$ (inclusive) where N is equal to $BT/2$ (which will be supposed whole).

To obtain the signals to be transmitted by the base stations, memories may also be read containing appropriate samples of the signals having the spectra in question.

As far as processing carried out in the mobile station is concerned, preferably, the signal received is sampled at a sampling frequency at least equal to the width B of the band used for transmission.

To obtain the impulse response of each channel, the following procedure may be adopted:

a) a determination is made of:
   the amplitude of the lines located on the frequencies k/T to obtain a first spectrum,
   the amplitude of the lines on the frequencies k/T +(n−1)/pT to obtain an $n^{th}$ spectrum,
   the amplitude of the lines on the frequencies k/T +(p−1)/pT to obtain a $p^{th}$ spectrum,
b) for each spectrum, is calculated the ratio of the amplitude of its lines to the amplitude of the corresponding lines of the transmitted signal,
c) an inverse Fourier transform of the different ratios obtained is carried out.

A different possible procedure would be to correlate the signal received, on a window of time duration pT, with the different signals transmitted by the first, through the $n^{th}$, through the $p^{th}$ base station, so as to obtain the impulse response of the first, through the $n^{th}$, through the $p^{th}$ channel.

The process which has just been defined is applied whatever the number of channels. In the particular case where this number is equal to 2, the process is such that:

- the signal transmitted by one of the stations has a line spectrum on the frequencies k/T,
- the signal transmitted by the other station has a line spectrum on the frequencies (k/T)+(½T),
- the signal received by the mobile station is processed in a window of width 2T.

DETAILED DISCLOSURE OF PARTICULAR EMBODIMENTS

Figure 1:
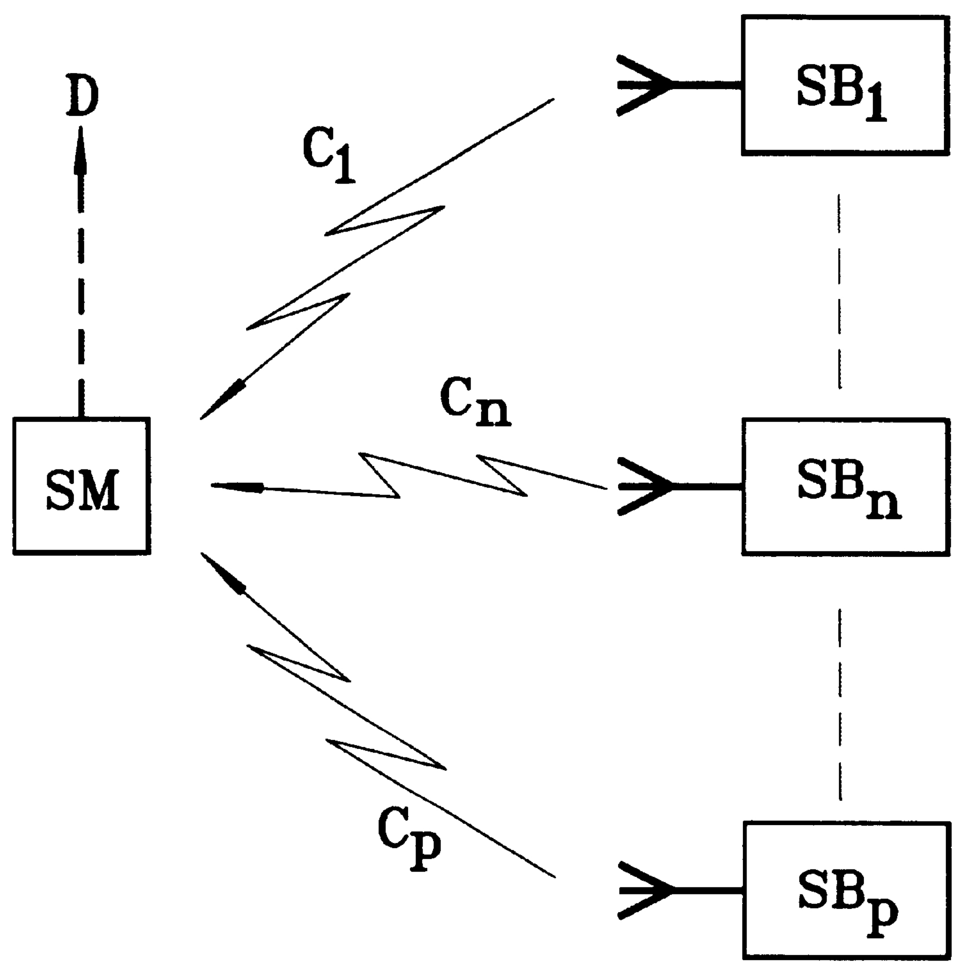
FIG. 1 shows diagrammatically a radio-communications system with several base stations and one mobile station.

FIG. 1 shows diagrammatically a radio-communications system including p base stations $SB_1$, through $SB_n$, through $SB_P$ and a mobile station SM moving in the direction D. A plurality of p radio-frequency channels $C_1$, through $C_n$, through $C_p$ are thus defined between the base stations and the mobile station. The invention proposes to measure the impulse response of each of these p channels, and to do so simultaneously.

Before describing how this is done, there may be some value in recalling to mind some general principles of signal processing in the telecommunications context.

A radio-frequency channel may be considered as a linear filter. It is known that it is possible to define for such filters an impulse response, which is the response of the filter to an input signal which would be a Dirac pulse. The impulse response idea is particularly useful because it allows calculation of the filter response y(t) to any input signal x(t). This gives in fact:

$$y(t)=(x*h)(t) \tag{1}$$

where h(t) is the impulse response and where the sign * represents a convolution product.

If X(f), Y(f) and H(f) represent the Fourier transforms of x(t), y(t) and h(t) respectively, the following equivalent relation is given:

$$Y(f)=X(f)\cdot H(f) \tag{2}$$

which may be further expressed on frequencies where X is not cancelled:

$$H(f)=Y(f)/X(f) \tag{3}$$

In the hypothesis where x has good auto-correlation properties, the relation (1) may further be expressed:

$$(y*\overset{\triangledown}{x})(t)=((x*h)*\overset{\triangledown}{x})(t)=(h*(x*\overset{\triangledown}{x}))(t)=(h*\delta)(t)=h(t) \tag{4}$$

where $\underline{x}$=x(−t), where the−sign denotes the complex conjugation and where the symbol δ represents the Dirac distribution.

Thus the impulse response h(t) may be obtained from a radio-frequency channel in two different ways:

- knowing the spectra X(f) and Y(f), the ratio Y(f)/X(f) is calculated, which gives H(f) by the relation (3); by inverse Fourier transform, h(t) is found;
- from the signals transmitted and received, a convolution $$(y*\overset{\triangledown}{x})(t)$$

is effected, which gives h(t) directly by the relation (4).

The first method is known as "frequency" method (or else by inversion, by implication by Fourier transform); the second is known as "time" method.

Figure 2A:
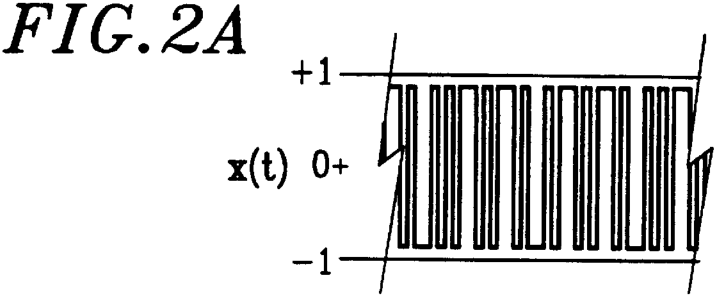
FIGS. 2A and 2B show a bit sequence and the corresponding spectrum after filtering.
Figure 2B:
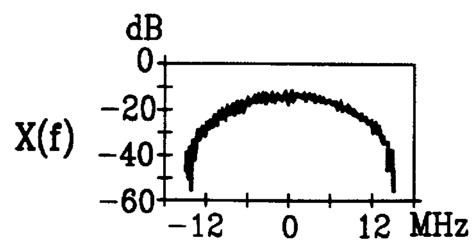
Figure 3A:
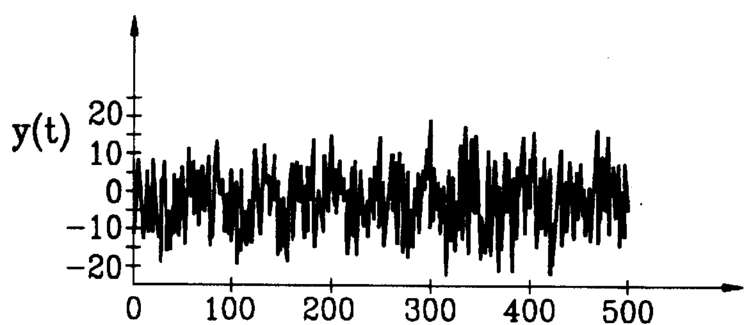
FIGS. 3A and 3B show a received sequence and the corresponding spectrum after filtering.
Figure 3B:
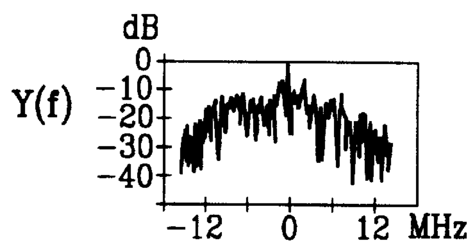
Figure 4:
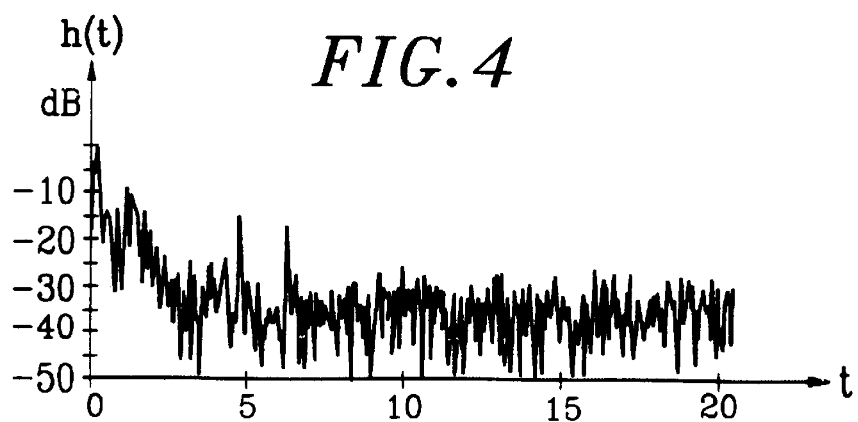
FIG. 4 shows the pace of an impulse response.

FIGS. 2A, 2B, 3A, 3B and 4 show the pace of some signals and of some spectra in this technology and allow illustration of these two methods. FIG. 2A, first of all, shows a bit sequence x(t) taking the values +1 and −1 over a time period which is here, by way of example, of 500 μs. FIG. 2B shows the spectrum X(f) after filtering. It extends over about 30 MHz. When such a signal modulates a carrier (not shown), it is received and demodulated to give a signal y(t)

shown in FIG. 3A; the corresponding spectrum Y(f) is shown in FIG. 3B.

To obtain the impulse response h(t) of the channel having transmitted this signal, it is therefore possible to proceed in two different ways as explained above:

- by the frequency method: having available the spectrum X(f) of the transmitted signal and the spectrum Y(f) of the received signal, the ratio Y(f)/X(f) is calculated, which gives H(f); then, by inverse Fourier transform, the impulse response h(t) is regained;
- by the time method: knowing the received signal y(t) and the transmitted signal x(t), the convolution product $$(y * \overset{\triangledown}{x})(t)$$

is effected, which gives directly the impulse response being sought h(t).

Bearing all this in mind, we may now turn to the invention itself. It will be described in the particular case of two channels, but extension to any number of channels is immediate.

Figure 5:
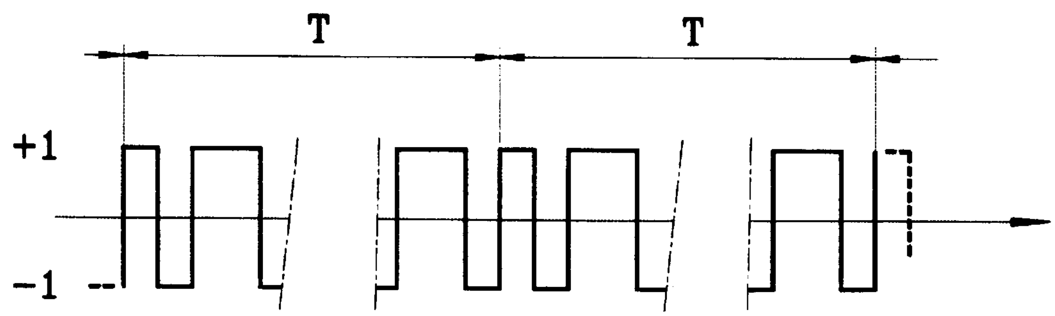
FIG. 5 shows an example of bit sequences forming a periodic signal.

In a particular mode of implementation, a bit sequence of duration T is first produced like the sequence shown as an example in FIG. 5. The bits are equal to +1 or to −1 but, of course, it could be a sequence of 1 and 0. The duration T may be of a few tens of microseconds, for example 20 $\mu$s.

The sequence of duration T is repeated identically. Thus a periodic signal of time period T is obtained, two periods of which are shown in FIG. 5.

Figure 6A:
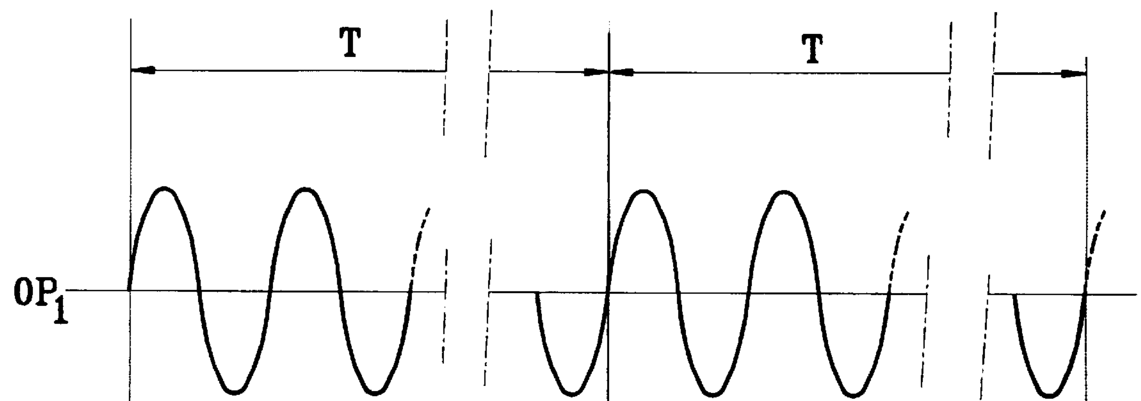
FIG. 6A shows a first carrier wave and FIG. 6B a second carrier wave obtained from the first by frequency offset of ½T.
Figure 6B:
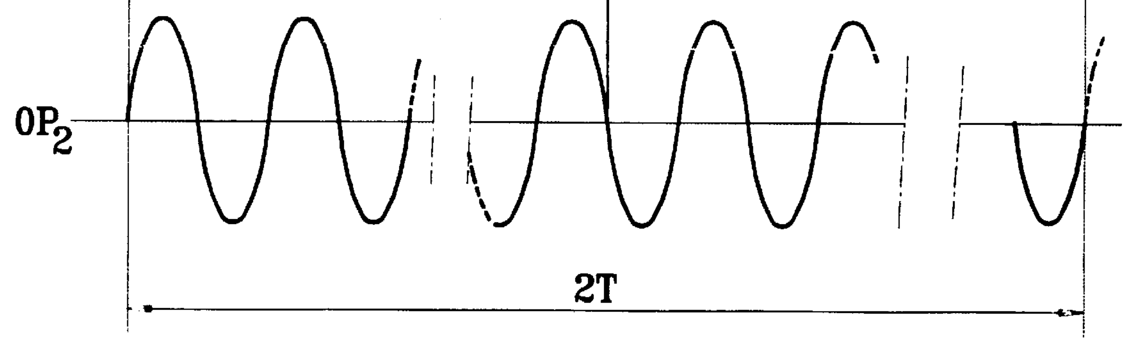

A carrier wave is then created, the pace of which is shown in FIG. 6A. This carrier $OP_1$ has a certain frequency $f_0$. This value may be for example 2.2 GHz. The time scale in FIG. 6A is therefore unrelated to the time scale in FIG. 5. This carrier wave is frequency offset by the quantity ½T so as to constitute a second carrier wave $OP_2$ (FIG. 6B). After a time period T, this second carrier $OP_2$ is in phase opposition with the first $OP_1$, but is back in phase with it after an interval 2T.

The periodic signal in FIG. 5 modulates at one and the same time the first carrier $OP_1$ and the second $OP_2$. The signals obtained $s_1(t)$ and $s_2(t)$ are of periodicity T for the first and 2T for the second.

Figure 7A:
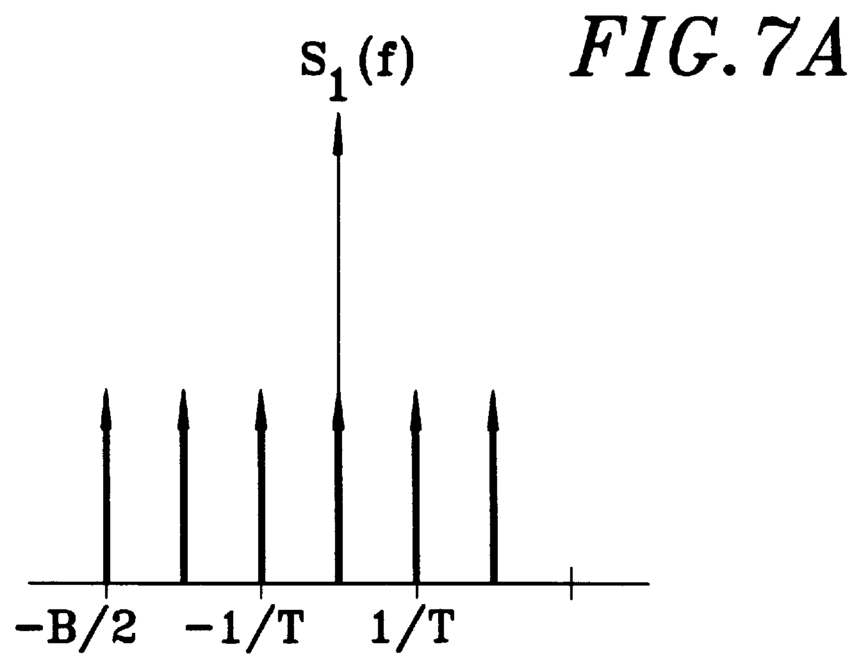
FIG. 7A shows the spectrum $S_1(f)$ of a first signal transmitted by a first base station and FIG. 7B the line spectrum $S_2(f)$ of a second signal transmitted by a second base station.
Figure 7B:
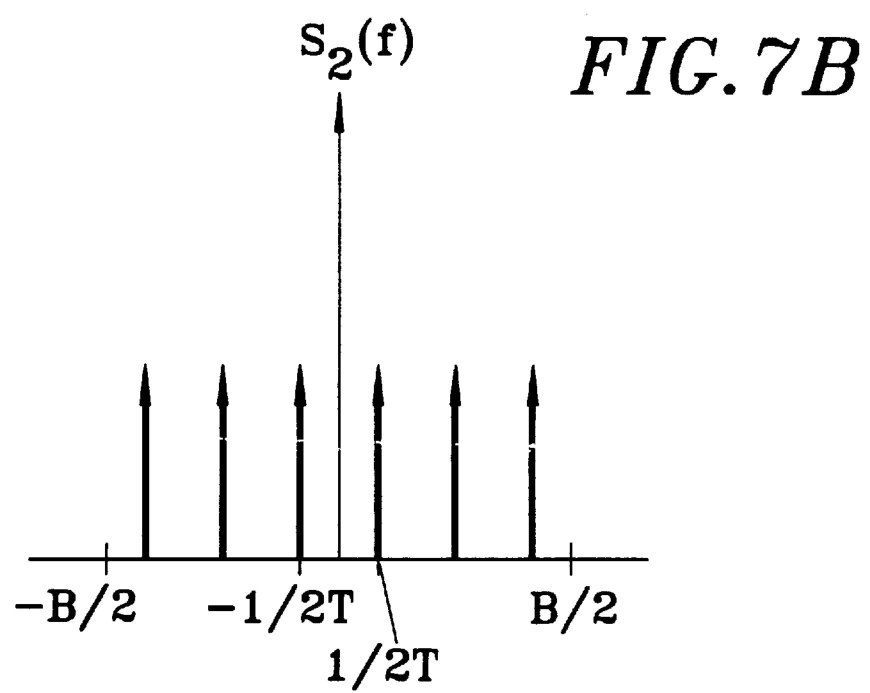

The baseband spectra (i.e. around the central frequency $f_0$) are shown in FIGS. 7A and 7B. As the signal in FIG. 5 is periodic of time period T, the spectrum $S_1(f)$ corresponding to the carrier $OP_1$ is formed of lines on frequencies k/T where k is a whole number. For the carrier $OP_2$, the spectrum $S_2$ (f) is frequency offset by ½T but it is still constituted by lines apart by k/T. The lines are therefore located at (k/T)+(½T).

The spectra $s_1(f)$ and $s_2(f)$ may be limited to a band of value B, for example by means of transmit-end filtering. They extend then from −B/2 (inclusively) to B/2 (exclusively). (In practice, a Hamming frequency window is applied to the signal received). If N/T=B/2 is posited, the number k takes all the whole number values between −N and N−1 (inclusive).

The spectra of the two signals transmitted by the two base stations are therefore interleaved.

If one of the periodic signals is multiplied by the other and the sum is made of the products obtained over the duration 2T (which is the smallest common multiple of the periods) opposite quantities will be obtained in the two periods of duration T, with the result that the sum on 2T will be nil. It may therefore be said that the two signals transmitted are "orthogonal".

It may thus be understood that, according to the invention, each signal transmitted by a base station has a signature, in the event spectral, which distinguishes it from the signal transmitted by the other station. Since, additionally, the signals transmitted are orthogonal to each other, they do not mix and retain their individuality. Their propagation may therefore be followed through the two channels.

Figure 8:
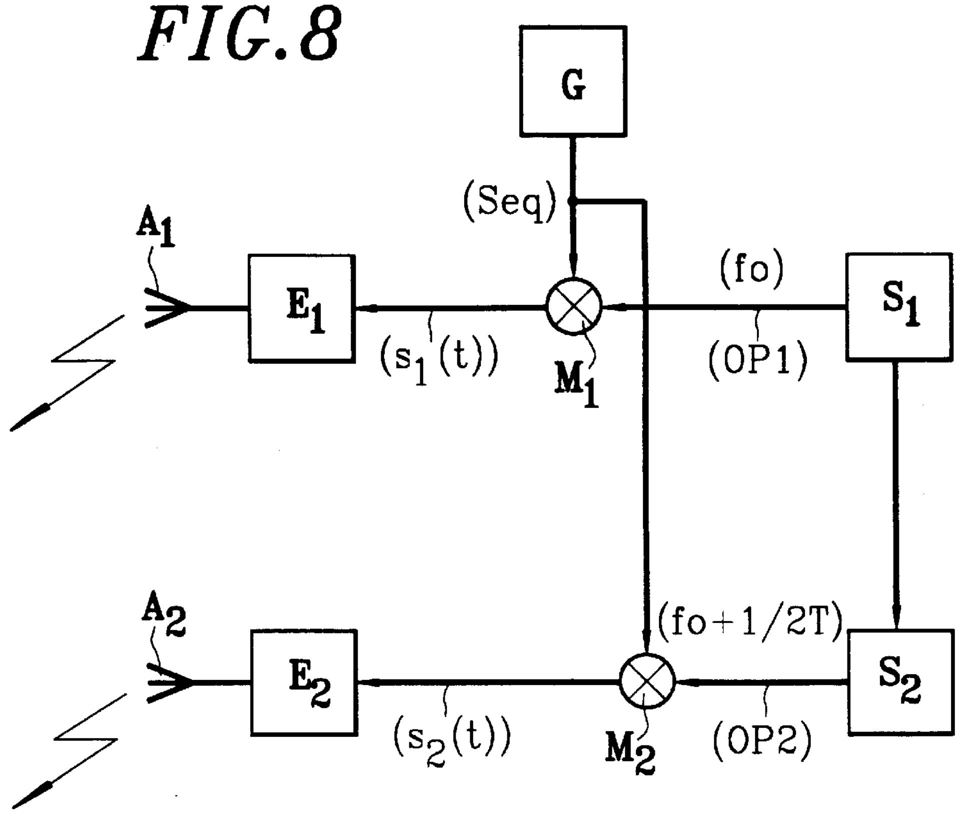
FIG. 8 shows a first embodiment of the means making it possible to generate the two signals transmitted by the base stations.
Figure 9:
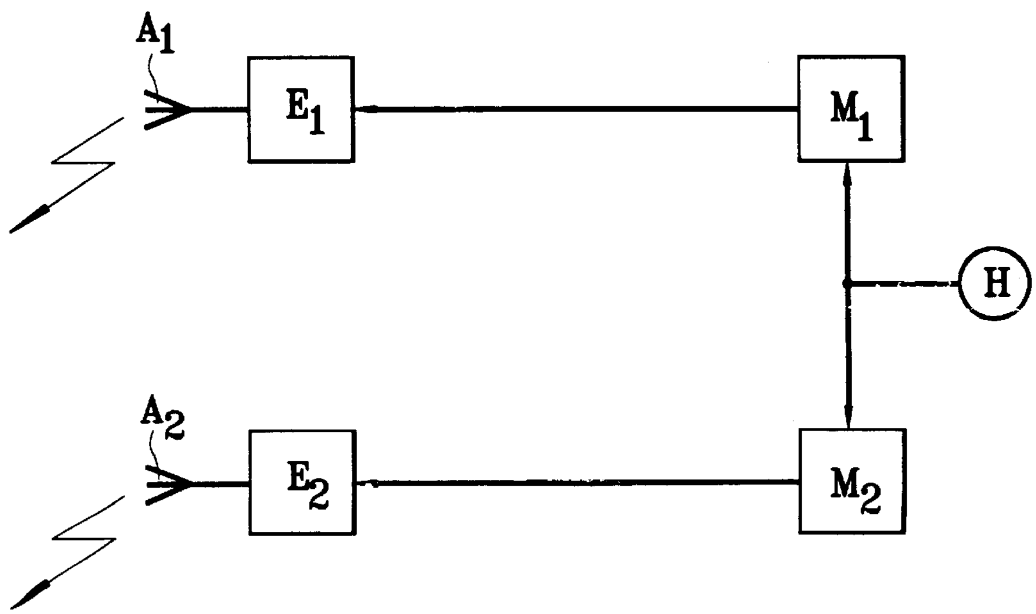
FIG. 9 shows a second embodiment of the means making it possible to generate the two signals transmitted by the base stations.

FIGS. 8 and 9 show two means of formation and transmission of the signals $s_1(t)$ and $s_2(t)$ by the two base stations. In FIG. 8, first of all, can be seen two synthesisers $S_1$, $S_2$ delivering the carrier waves $OP_1$ and $OP_2$, the second being frequency offset by ½T relative to the first; also seen is a pseudo-random sequence generator G, two multipliers $M_1$, $M_2$ receiving the two carrier waves and the sequence; these multipliers deliver the two signals $s_1(t)$ and $s_2$ (t); lastly, two transmitters $E_1$, $E_2$ amplify these signals so as to give them appropriate power and two antennae $A_1$, $A_2$ transmit the radio-frequency waves in the direction of the mobile station.

FIG. 9 shows a variant wherein samples of the signals $s_1(t)$ and $s_2(t)$ have been entered in two memories $M_1$, $M_2$, which are read at a clock rate H. Two transmitters $E_1$, $E_2$ connected to two antennae $A_1$, $A_2$ also allow radio-frequency transmission.

Figure 10A:
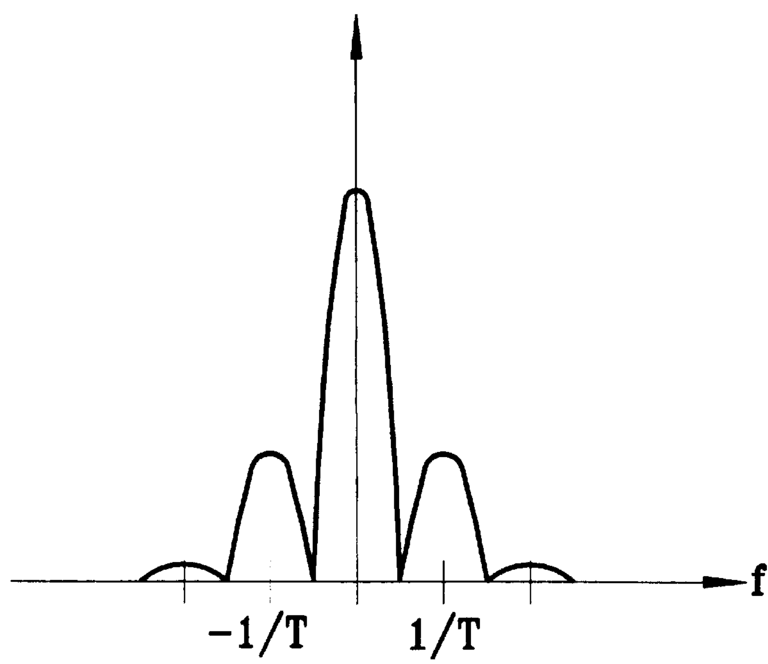
FIGS. 10A and 10B show the influence of a window of width 2T applied to a signal.
Figure 10B:
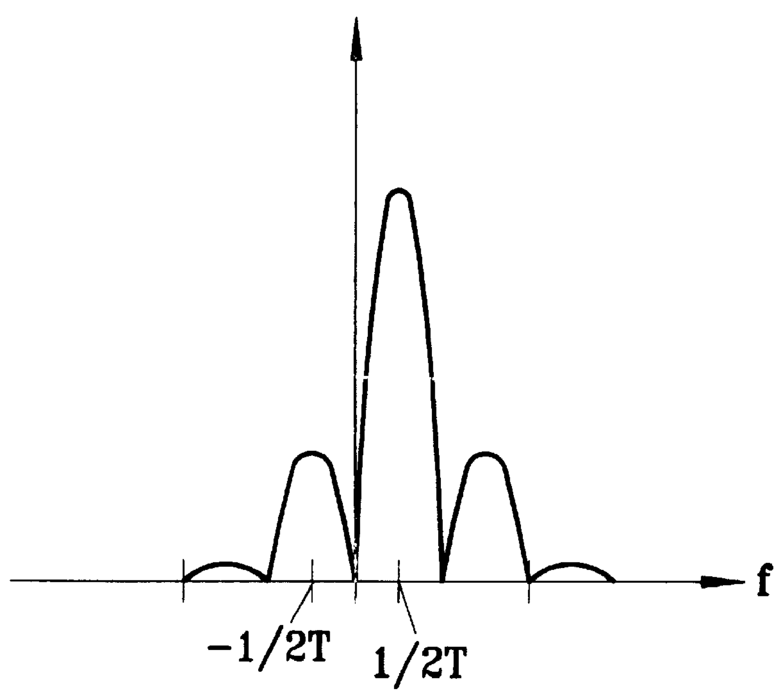

The signals $s_1(t)$ and $s_2(t)$ having been thus transmitted, it remains for them to be received in the mobile station and for them to be processed so as to reproduce the impulse response of each channel. As has already been shown, the signal received is observed in a time window of duration 2T. It is known that time limiting a signal entails frequency filtering according to a function of the $\sin(\pi f\tau)/\pi f\tau$ type where $\tau$=2T. This function is known as "cardinal sine". Each signal line so limited is spread in frequency as shown in FIG. 10A for a line located at the centre of the band as is the case for the central line of the signal $s_1(t)$ transmitted by the first station; the FIG. 10B shows the same phenomenon for a line of the second signal located at ½T. It may be observed that the main lobe of one of the cardinal sines coincides with a zero on the other and vice versa. This interleaving occurs for all the lines of the two signals with the result that the spectra of the two signals do not mix at the receive end.

Figure 11A:
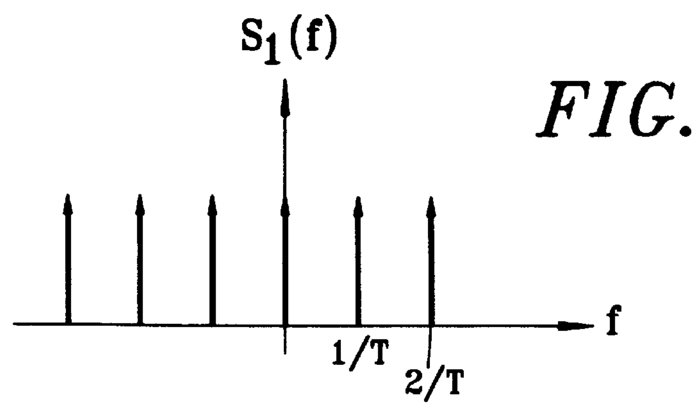
FIGS. 11A, 11B, 11C and 11D show different signals appearing in frequency signal processing.
Figure 11B:
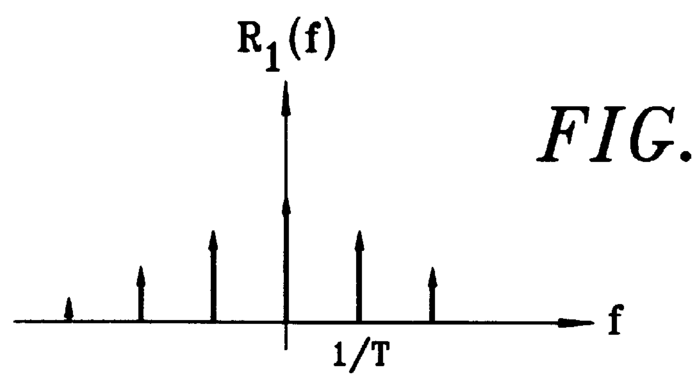
Figure 11C:
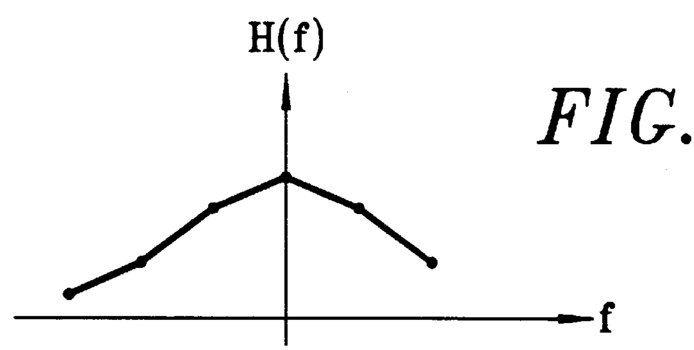
Figure 11D:
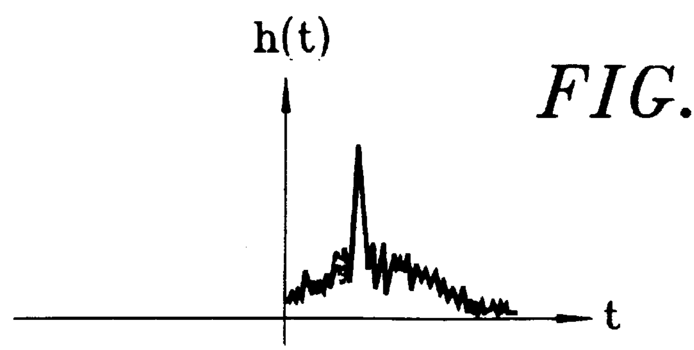

FIGS. 11A to 11D show diagrammatically some signals involved in a frequency processing mode. FIG. 11A, firstly, shows the spectrum of the first signal, i.e. $s_1(f)$, at the transmit end, which is also the spectrum of the signal which would be received if the transmitter and the receiver were connected by an ideal cable. FIG. 11B shows the spectrum $R_1(f)$ actually received. The complex amplitude ratio of the lines gives the function H(f) in FIG. 11C. By inverse Fourier transform (for example by inverse DFT), it is possible to go back in time to obtain the impulse response h(t) of the first channel, as shown in FIG. 11D.

Synthetically it may be expressed as:

$$h_1(t)=DFT^{-1}[R1(k/T)/S_1(k/T)].$$

Likewise for the second channel, the calculation is:

$$h_2(t)=DFT^{-1}[R_2((k/T)+(½T)/S_2((k/T+½T))].$$

Instead of using the discrete Fourier transform DFT, the fast Fourier transform (FFT) may be used which speeds up the calculations. Its implementation is facilitated when the number p of transmitters and the whole number N relative to the number of lines are to the power of two. An adjustment of the parameters B and T makes it possible to obtain a suitable whole number N. If the number p of base stations is not to the power of two, the whole number p' is determined to the power of two greater than p and the closest to p. The method described is applied with this new value, it being understood that p'-p base stations deliver no signal and are virtual.

For example, with 6 base stations, 2 virtual stations will be considered so as to bring the number of stations to 8, an exact power of 2 and all processing will be conducted as if there were 8 stations (i.e. $2^3$), knowing that in reality 2 of these stations are virtual.

The variant which has just been described is of the frequency type. A time variant could also be implemented by effecting a correlation between the signals transmitted and received. The signal received is passed through a bank of two digital filters adapted to the pattern (of duration 2T) transmitted from each channel. The filter output clearly gives two consecutive copies of the transmission channel impulse responses (transmission-propagation-reception). The first copy is a non out-of-phase version of the expected impulse response and the second is out-of-phase by the quantity $-\pi$. By truncation, the impulse response estimated over the duration T and sampled on the frequency B is extracted.

In a more general way, if instead of two channels there are p, to process the channel of rank n 1<n<p a choice may be made of:

- retaining only the 2N information lines on the frequencies (k/T)+(n−1)/pT; centring the corresponding line on the frequency (n−1)/pT; calculating the ratio of the complex line amplitude to the complex line amplitude of the corresponding signal received when transmitter and receiver are connected by an ideal cable; going back in time by inverse DFT, then correcting by a quantity $e^{j2\pi(n-1)t/PT}$; an estimate of the impulse response of the $n^{th}$ propagation channel over the duration T and sampled on the frequency B is thus recovered;
- retaining all the 2Np lines, substituting the nil value for the non informative 2N(p−1) lines; going back in time by inverse DFT; to one phase shift period or so, p consecutive copies of the $n^{th}$ impulse response, of total duration pT may be observed; the first copy is a non out-of-phase version of the expected impulse response, the $k^{th}$ copy is out-of-phase by the quanity $$\frac{-2\pi(n-1)(k-1)}{p},$$

lastly the pth is out-of-phase by the quantity $$\frac{-2\pi(n-1)(p-1)}{p};$$

by truncation, the impulse response estimated over the duration T and sampled on the frequency B is extracted.

For the time method, the signal received will be passed through a bank of p digital filters adapted to the pattern (of duration pT) transmitted from each channel. To one phase shift period or so, the output of the $n^{th}$ filter clearly gives p consecutive copies of the $n^{th}$ transmission channel impulse response (transmission-propagation-reception). The first copy is a non out-of-phase version of the expected impulse response, the $n^{th}$ is out-of-phase by the quantity $-2\pi(n-1)/pT$, lastly the $p^{th}$ is out-of-phase by the quantity $-2\pi(p-1)/pT$. By truncation, the impulse response estimated over the duration T and sampled on the frequency B is extracted.

By way of explanation, an experiment will now be described which was conducted in macro-diversity with two transmitters.

The first source transmits periodically, at the flow rate of 12.5 Mbits/s, a sequence of 255 bits. This signal modulates a carrier on the 2.2 GHz frequency then is filtered and amplified. The analysed band is centred around 2.2 GHz and is at the most 25 MHz wide with N=255. The period T has a value 20.4 μs. The frequency offset of the channel 2 therefore has a value of ½T-24.451 kHz. It will be observed incidentally that this offset is very large relative to the about twenty Hertz which was encountered in the prior art after introduction of an artificial Doppler effect. The frequency offset may be achieved during modulation by using synthesisers at the respective frequencies $f_0$ and $f_0$+½T (FIG. 8). It may also be obtained by previously putting out-of-phase by $\pi t/2T$ a sequence memorised in baseband by the second transmitter over the time period 2T. This sequence, read with the periodicity 2T and modulating in amplitude a frequency carrier $f_0$ gives the expected signal. In this configuration, the synthesisers both deliver the same frequency $f_0$.

Figure 12:
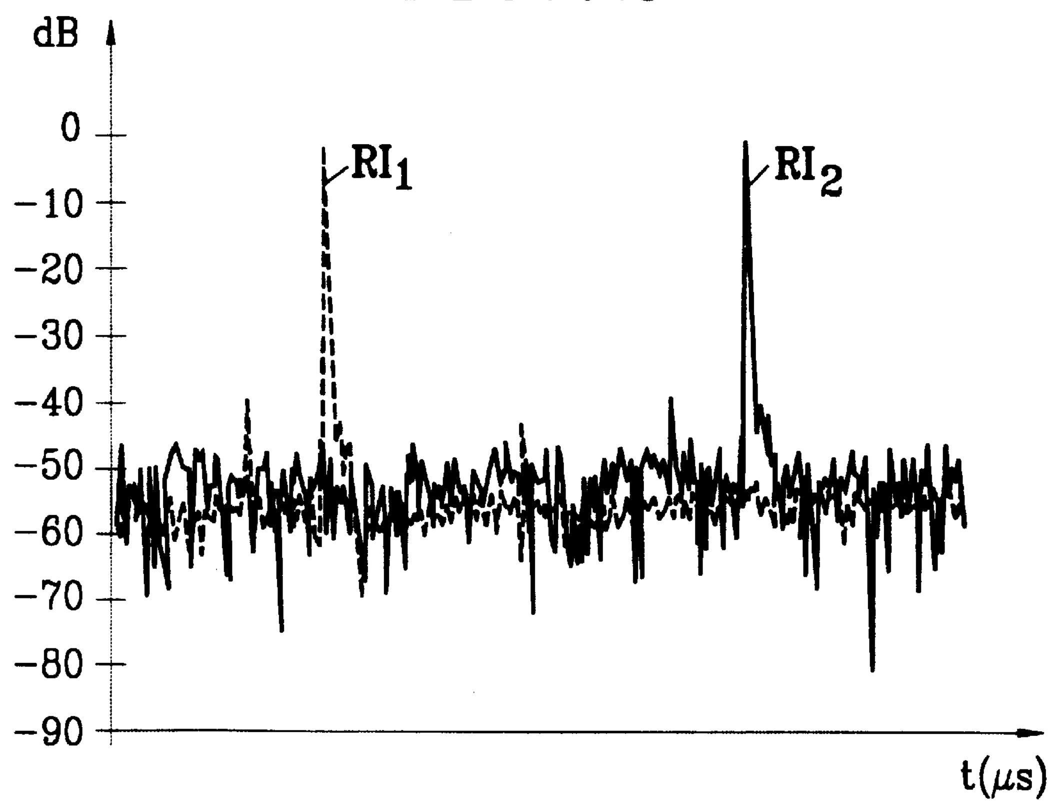
FIG. 12 shows an example of two impulse responses in the situation where the base stations are visible from the mobile station.
Figure 13:
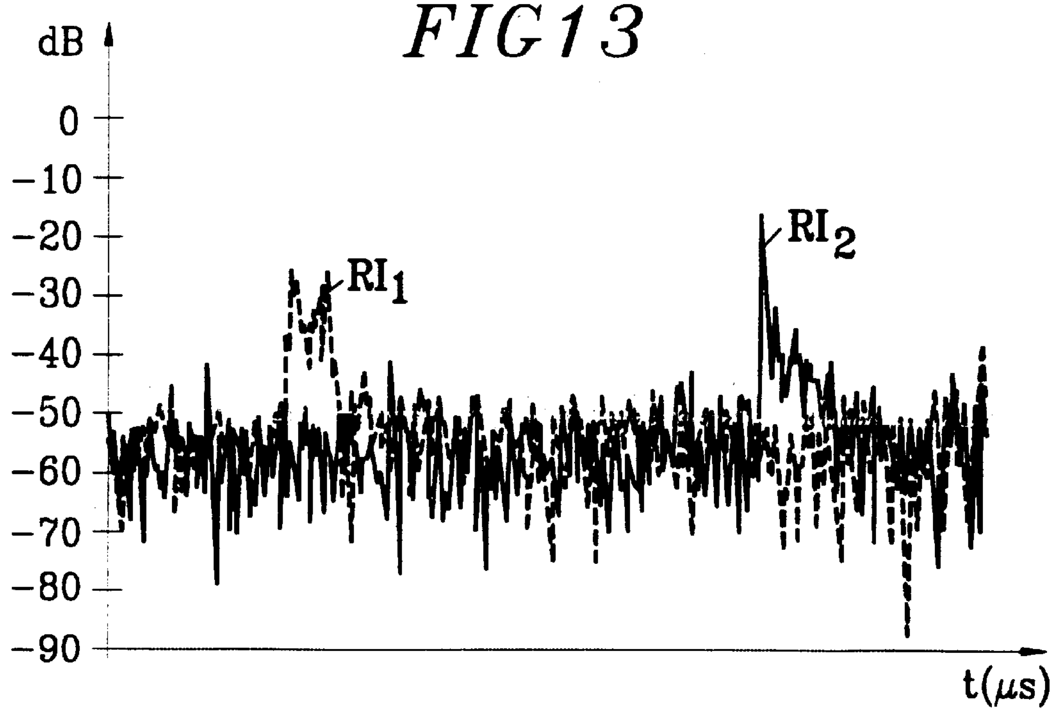
FIG. 13 shows another example of two impulse responses, in the situation where the base stations are not visible from the mobile station.

In the first instance, the two radio-frequency sources are placed in the same spot and are visible from the mobile station. After processing, two identical (and offset) responses are obtained, which validates the experiment. This is what is shown in FIG. 12. The transmitters are then placed above the roofs and spaced apart by 600 metres, a typical macro-diversity configuration in a small urban cell. The effective power transmitted by each source is about 40 dBm. The receiver is located on the mobile vehicle. An acquisition lasts 40.6 μs and involves 1020 samples. The measuring points are spaced out by about 2 cm and the routes are about 60 metres long. An example of a pair of impulse responses measured by this process is given in FIG. 13. It attests to an excellent dynamic of the responses calculated.

The reception device may comprise an automatic gain control circuit to adapt the power of the signal received to the electronics of the receiver. To avoid too great a distortion of one of the channels, it is preferable for the signals coming from the two connections to reach the receiver with comparable mean power levels. This may be obtained by previously carrying out measurements of average narrow band fields, then by adjusting the signal strengths as a consequence. This precaution is moreover valid whatever the "master distance" with diversity type measurement process.

A bias on the carrier frequency of one of the transmitters relative to the nominal value or a slip in the flow rate at the transmit end of one of the channels may alter the performance of the link. These two defects bring about an overlapping of the cardinal sines on the frequencies k/2T and have been studied in simulation. Degradations are perceptible for carrier frequency errors beyond about a hundred Hertz, therefore of the order of a hundredth of the line separation, and inaccuracy over the duration T greater than about twenty nanoseconds, therefore of the order of a hundredth of the sampling period. These margins are amply respected by the hardware available.

What is claimed is:

1. A process for simultaneously measuring, over a period of observation T, the propagation characteristics of a plurality of p radio-frequency channels (p whole number at least equal to 2) between p base stations and a mobile station, characterised in that:

- from each of the base stations is transmitted simultaneously a periodic signal of period pT, the signal transmitted by the station of rank n (n going from 1 to p) having a spectrum constituted by lines located on the frequencies (k/T)+(n−1)/pT) where k is the number of the line,
- the p signals transmitted by the p stations are received simultaneously in the mobile station and the signals received are processed in a time window of width pT so as to extract the p impulse responses of the p radio-frequency channels.

2. A process according to claim 1, wherein, for transmission at $n^{th}$ station level:

a sequence of elements of duration T is produced, this sequence is reproduced with a period T so as to obtain a periodic signal of period T, a carrier wave is produced having a frequency equal to the central frequency $F_0$ of the frequency band to be analysed, the frequency of the carrier wave is offset by the quantity $(n-1)/pT$, the signal obtained is transmitted after modulation of the carrier thus offset.

3. A process according to claim 1, wherein the band of the transmitted signals is reduced by filtering so as to limit the band to a width B, the spectra of the transmitted signals extending from $-B/2$ (included) to $B/2$ (included) and the number k thus taking all the whole values between $-N$ (inclusive) and $N-1$ (exclusive) where N is equal to $BT/2$.

4. A process according to claim 1, wherein, before the p signals received in the mobile station are processed, said received signals previously demodulated to the frequency $F_0$ are sampled.

5. A process according to claim 1, wherein, in the mobile station, said processing consists in:

a) determining the amplitude of the lines on the frequencies $(k/T)+((n-1)/pT)$ to obtain p spectra $(R_n(f))$, b) calculating, for each spectrum, the ratio of the amplitude of its lines to the amplitude of the corresponding lines of the transmitted signal, c) carrying out an inverse Fourier transform of the different ratios obtained.

6. A process according to claim 1, wherein, in the mobile station, said processing consists in correlating the signal received with the different signals transmitted by the p base stations so as to obtain in this way the respective impulse responses of the p channels.

7. A process according to claim 1, wherein:

the received demodulated and sampled signals are passed through a bank of p digital filters adapted to the periodic signals of duration pT, at the output of the $n^{th}$ filter are collected p consecutive copies of the impulse response of the $n^{th}$ channel, the first copy being a non out-of-phase version of the impulse response being sought.

8. A process according to claim 1, wherein, to obtain the signals to be transmitted by the base stations, memories are read containing samples of the signals having the spectra in question.

9. A process according to any one of the claim 1 wherein the number p of base stations not being equal to a power of two, the whole number p' is determined greater than p and the closest to p, and which is a power of two, and the process is implemented as if there were p' base stations, p'-p of these stations being virtual.

* * * * *

UNITED STATES PATENT AND TRADEMARK OFFICE

CERTIFICATE OF CORRECTION

PATENT NO. : 6,823,175 B1
DATED : November 23, 2004
INVENTOR(S) : Zayana et al.

It is certified that error appears in the above-identified patent and that said Letters Patent is hereby corrected as shown below:

Column 11,
Line 14, please delete "claim 1" and insert therefor -- claim 2 --.
Line 20, please delete "claim 1" and insert therefor -- claim 3 --.
Line 24, please delete "claim 1" and insert therefor -- claim 4 --.

Column 12,
Line 3, please delete "claim 1" and insert therefor -- claim 4 --.
Line 9, please delete "claim 1" and insert therefor -- claim 6 --.
Line 19, please delete "claim 1" and insert therefor -- claims 1 or 2 --.

Signed and Sealed this

Twenty-second Day of March, 2005

JON W. DUDAS
*Director of the United States Patent and Trademark Office*